United States Patent
Kraus et al.

(10) Patent No.: US 11,611,650 B2
(45) Date of Patent: Mar. 21, 2023

(54) SITUATIONAL BLOCKING OF SIM UPDATES AND/OR REQUESTS

(71) Applicant: Continental Automotive Systems, Inc., Auburn Hills, MI (US)

(72) Inventors: John P. Kraus, Palatine, IL (US); James A. Walby, Delavan, WI (US); Ankur Darji, Schaumburg, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 116 days.

(21) Appl. No.: 17/120,700

(22) Filed: Dec. 14, 2020

(65) Prior Publication Data
US 2022/0191320 A1 Jun. 16, 2022

(51) Int. Cl.
| | |
|---|---|
| *H04W 4/90* | (2018.01) |
| *G06F 8/65* | (2018.01) |
| *H04M 1/72463* | (2021.01) |
| *H04W 48/02* | (2009.01) |

(52) U.S. Cl.
CPC .......... *H04M 1/72463* (2021.01); *G06F 8/65* (2013.01); *H04W 4/90* (2018.02); *H04W 48/02* (2013.01)

(58) Field of Classification Search
CPC ... H04M 1/72463; H04W 4/90; H04W 48/02; G06F 8/65
USPC ........................................................ 455/418
See application file for complete search history.

(56) References Cited

U.S. PATENT DOCUMENTS

| | | | |
|---|---|---|---|
| 7,016,669 B2 | 3/2006 | Aerrabotu et al. |
| 8,270,962 B1 | 9/2012 | Maurer et al. |
| 8,397,228 B2 | 3/2013 | Matlin et al. |
| 8,459,510 B2 | 6/2013 | Richards et al. |

(Continued)

FOREIGN PATENT DOCUMENTS

| | | | |
|---|---|---|---|
| EP | 3840433 A1 * | 6/2021 | |
| WO | 2018211488 A1 | 11/2018 | |
| WO | 2019042541 A1 | 3/2019 | |

OTHER PUBLICATIONS

International Search Report and Written Opinion dated Mar. 29, 2022 from corresponding International patent application No. PCT/US2021/062522.

*Primary Examiner* — Ted M Wang

(57) ABSTRACT

While a SIM-enabled cellular device is in a disable-SIM-card-updates mode of operation during which SIM-card updates should be disabled, the SIM-enabled cellular device blocks updates of a cellular Subscriber Identity Module (SIM) card of the SIM-enabled cellular device. Upon determining that the SIM-enabled cellular device is no longer in the disable-SIM-card-updates mode, the SIM-card updates are no longer blocked. SIM-card updates may be blocked by blocking the following types of messages received by the SIM-enabled cellular device from a cellular network: Short Message Service (SMS) SIM, Short Message Service (SMS) SIM update, Bearer Independent Protocol (BIP) packet update, and Access Point Name (APN) packet update. The SIM-enabled cellular device may be an automotive Telematics Control Unit (TCU). The automotive TCU may enter the disable-SIM-card-updates mode due to an automotive telematics emergency call. The automotive-telematic-emergency call may include a call-back period during which the TCU remains available to receive an emergency call back from a telematics service center.

12 Claims, 6 Drawing Sheets

(56) References Cited

U.S. PATENT DOCUMENTS

| | | |
|---|---|---|
| 2009/0178033 A1 | 7/2009 | Challener et al. |
| 2010/0227588 A1 | 9/2010 | Bradley |
| 2014/0051379 A1 | 2/2014 | Ganesh et al. |
| 2016/0142087 A1* | 5/2016 | Inampudi ................ H04W 4/90 |
| | | 455/558 |
| 2017/0181071 A1* | 6/2017 | Lipka .................... H04W 48/18 |
| 2017/0269927 A1 | 9/2017 | Yuan |
| 2017/0324804 A1 | 11/2017 | Uy et al. |
| 2019/0082308 A1 | 3/2019 | Lee et al. |

\* cited by examiner

SITUATIONAL BLOCKING OF SIM UPDATES AND/OR REQUESTS

BACKGROUND

Many automotive telematics systems include cellular wireless connectivity, which typically makes use of a cellular Subscriber Identity Module ("SIM") card, which is a smart card inside a mobile phone, the smart card carrying an identification number unique to the owner, storing personal data, and preventing operation if removed.

A SIM card, is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards. SIM cards can also be used in satellite phones, smart watches, computers, cameras, and the like.

The SIM circuit is part of the function of a universal integrated circuit card (UICC) physical smart card, which is usually made of PVC with embedded contacts and semiconductors. SIM cards are transferable between different mobile devices.

A SIM card contains a unique serial number (ICCID), international mobile subscriber identity (IMSI) number, security authentication and ciphering information, temporary information related to the local network, a list of the services the user has access to, and two passwords: a personal identification number (PIN) for ordinary use, and a personal unblocking key (PUK) for PIN unlocking. In Europe, the serial SIM number (SSN) is also sometimes accompanied by an international article number (IAN) or a European article number (EAN) required when registering online for the subscription of a prepaid card.

Presently, wireless service providers are typically able to update SIM content at any point in time. But it is possible that such an update could occur during a time when an update is not desired (e.g. during an emergency call). By limiting or blocking SIM updates, this problem would be resolved.

Some SIM suppliers have a bit that can be set in the SIM card to disable SIM updates. When the bit is set, the SIM will block the update as desired.

Such an approach to disable SIM updates is SIM-supplier specific. Most SIM suppliers do not block SIM updates because they assume that cellular carriers will only perform SIM updates during "a good time" (e.g., not during an emergency call).

Cellular carriers will block SIM updates under some circumstances, such as an emergency call. But cellular service providers are typically unaware of automotive telematics emergency calls (which look like a normal phone call to the carrier) and emergency callback mode (during which an emergency operator at a call center can call back to the telematics device for a period of time).

Based on the foregoing information, improved techniques for blocking SIM updates would advance the state of the art.

BRIEF SUMMARY

In accordance with embodiments of the invention, while a SIM-enabled cellular device is in a disable-SIM-card-updates mode of operation during which SIM-card updates should be disabled, the SIM-enabled cellular device blocks updates of a cellular Subscriber Identity Module (SIM) card of the SIM-enabled cellular device. Upon determining that the SIM-enabled cellular device is no longer in the disable-SIM-card-updates mode, the SIM-card updates are no longer blocked. SIM-card updates may be blocked by blocking the following types of messages received by the SIM-enabled cellular device from a cellular network: Short Message Service (SMS) SIM, Short Message Service (SMS) SIM update, Bearer Independent Protocol (BIP) packet update, and Access Point Name (APN) packet update. The SIM-enabled cellular device may be an automotive Telematics Control Unit (TCU). The automotive TCU may enter the disable-SIM-card-updates mode due to an automotive telematics emergency call. The automotive-telematic-emergency call may include a call-back period during which the TCU remains available to receive an emergency call back from a telematics service center.

DETAILED DESCRIPTION

Figure 1:
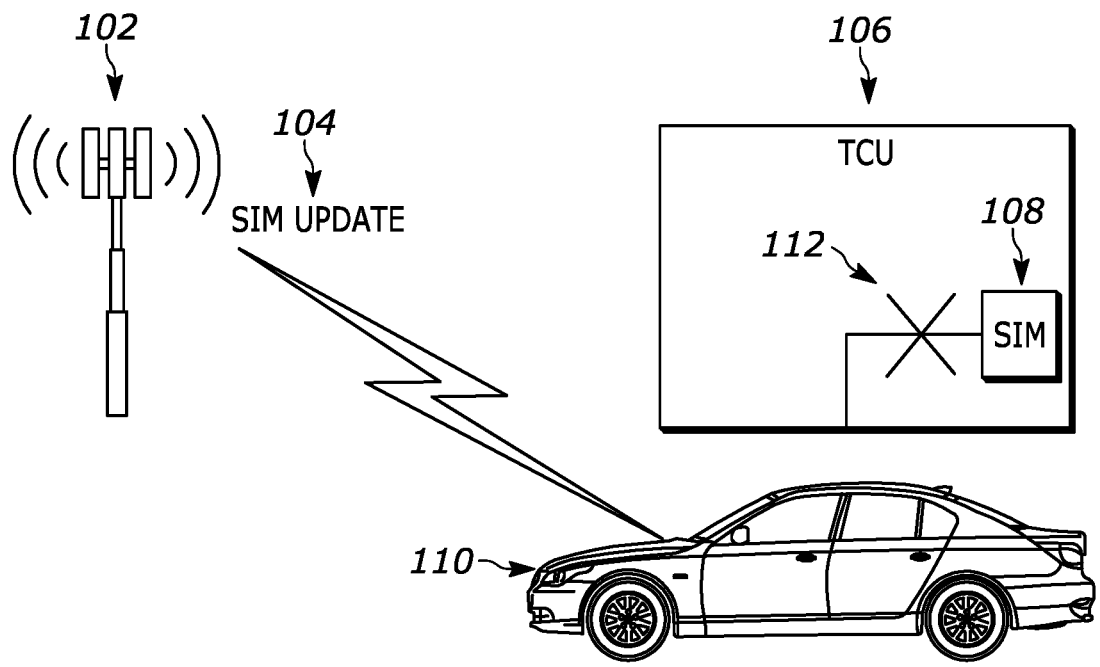
FIG. 1 schematically depicts blocking SIM card updates in accordance with embodiments of the invention.

In accordance with embodiments of the invention, while a SIM-enabled cellular device is in a disable-SIM-card-updates mode of operation during which SIM-card updates should be disabled, the SIM-enabled cellular device blocks updates of a cellular Subscriber Identity Module (SIM) card of the SIM-enabled cellular device. Upon determining that the SIM-enabled cellular device is no longer in the disable-SIM-card-updates mode, the SIM-card updates are no longer blocked. SIM-card updates may be blocked by blocking the following types of messages received by the SIM-enabled cellular device from a cellular network: Short Message Service (SMS) SIM, Short Message Service (SMS) SIM update, Bearer Independent Protocol (BIP) packet update, and Access Point Name (APN) packet update. The SIM-enabled cellular device may be an automotive Telematics Control Unit (TCU). The automotive TCU may enter the disable-SIM-card-updates mode due to an automotive telematics emergency call. The automotive-telematic-emergency call may include a call-back period during which the TCU remains available to receive an emergency call back from a telematics service center.

In the drawings and the examples discussed below, the SIM-enabled cellular device is an automotive TCU, and the disable-SIM-card-updates mode is entered during an automotive telematics emergency call. In accordance with embodiments of the invention, other types of SIM-enabled cellular devices, may include mobile phones, computers, smart watches, cameras, and the like. And the disable-SIM-card-updates mode may be entered during operating modes of a SIM-enabled cellular device other than an automotive telematics emergency call. Examples of such other operating modes include but are not limited to: a fall-alert system for use by elderly people in which the system calls a backend for help when a person has fallen and can't get up, which is a situation in which a call should not be interrupted for a SIM-card update; and certain data sessions should not be interrupted, such as, if a home-security system triggers an alert and is streaming video to a SIM-enabled device, that would be another example of an inopportune time for a SIM-card update to interrupt the data session. In both of these examples, like in the example of an automotive-telematics emergency call, the cellular carrier would not be aware that cellular calls in these scenarios involved were of an emergency nature that should not be interrupted by SIM-card updates from the cellular carrier.

There are additional automotive-telematics-related examples of situations in which blocking of SIM-card updates may be desirable. SIM-card updates may be blocked based on a vehicle's ignition status. For example, SIM-card updates may be blocked while the ignition is off, SIM-card updates may be blocked while the ignition is on, or SIM-card updates may be blocked while both the ignition is on and a vehicle occupant has not yet specifically authorized SIM-card updates.

For autonomous vehicles, SIM-card updates may be blocked based on the vehicle being in use or based on whether it is being serviced. For example, SIM-card updates may be blocked while a vehicle is not in a "service bay" such that SIM-card updates are effectively allowed only while the vehicle is in for some type of maintenance service. SIM-card updates may be blocked while the vehicle is "in use" (i.e., actively transporting people and/or cargo or on the way to pick up a delivery for transport).

FIG. 1 schematically depicts blocking SIM card updates in accordance with embodiments of the invention. An intended SIM update 104 from a base station 102 of a cellular network is blocked (as indicated at 112) from reaching the SIM card 108 within a Telematics Control Unit (TCU) 106 of a vehicle 110.

Figure 2:
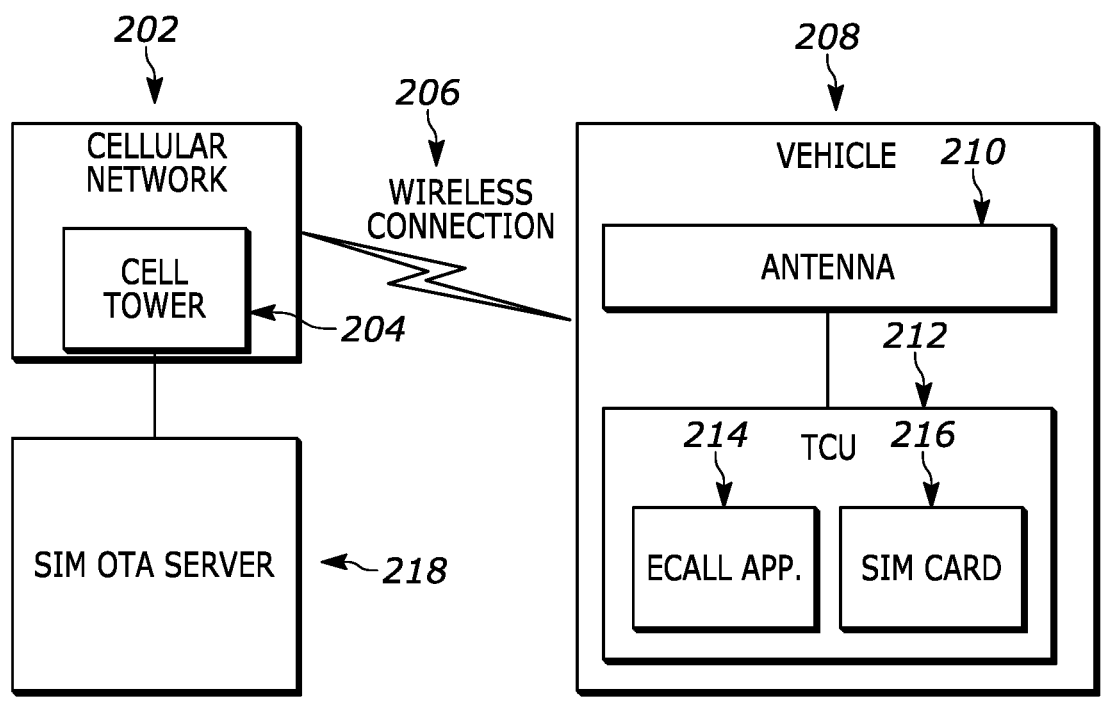
FIG. 2 schematically depicts system components for blocking SIM card updates in accordance with embodiments of the invention.

FIG. 2 schematically depicts system components for blocking SIM card updates in accordance with embodiments of the invention. A cellular network 202, which is in communication with a SIM Over the Air (OTA) server, includes a cell tower 204, which establishes a wireless communication connection 206 with a vehicle 208, which includes an antenna 210 and a TCU 212, which includes an emergency (E-call) application (app) 214 and a SIM card 216.

Figure 3:
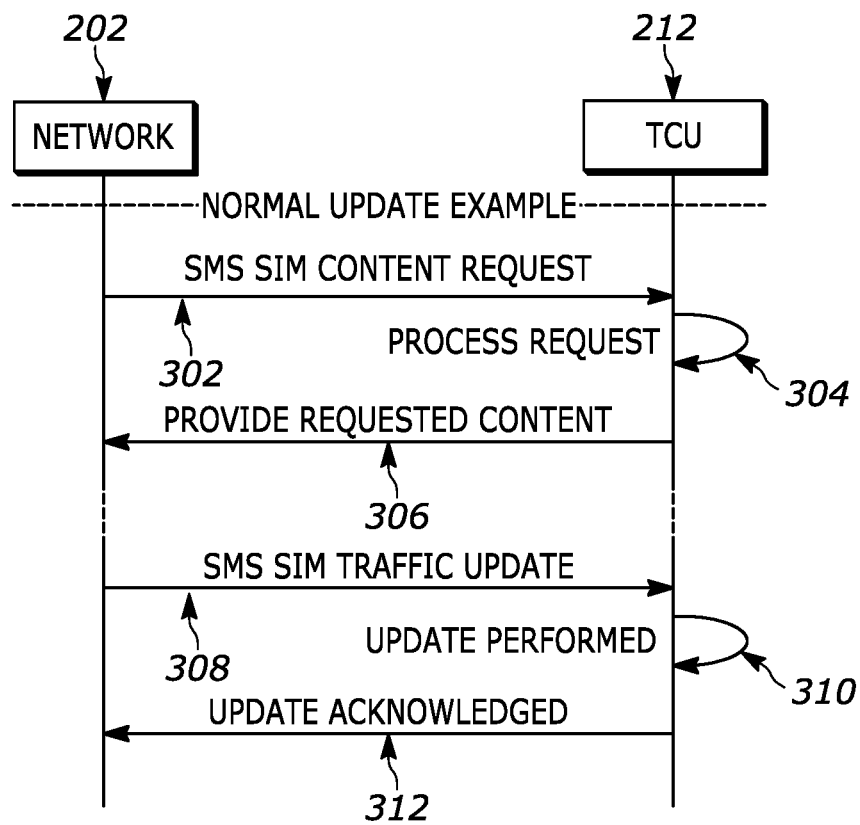
FIG. 3 depicts a conventional sequence involving an SMS SIM content request and an SMS SIM traffic update.

FIG. 3 depicts a conventional sequence involving an SMS SIM content request and an SMS SIM traffic update. The network 202 sends to the TCU 212 an SMS message to request SIM, as depicted at 302. The TCU processes the request message, as depicted at 304, and provides the requested content to the network, as depicted at 306. Subsequently, as depicted by the dashed vertical lines below 306, the network sends to the TCU an SMS message with data content to be used by the TCU for updating the SIM card, as depicted at 308. The TCU then updates the SIM card accordingly, as depicted at 310. The TCU then sends an update-acknowledgement message to the network, as depicted at 312.

The term "traffic" as used herein refers to one or more messages sent between the Network 202, the SIM OTA server 218, and the TCU 212. For example, "SMS traffic" refers to one or more SMS messages sent between various system components, such as, the network and the TCU. Similarly "update traffic" refers to one or more messages, containing data content for use by the TCU in updating a SIM card, sent to the TCU from the network and/or the SIM OTA server. And "request traffic" refers to one or more messages, which effectively requests the TCU to provide SIM-card data to the network and/or the SIM OTA server, sent to the TCU from the network and/or the SIM OTA server.

Figure 4:
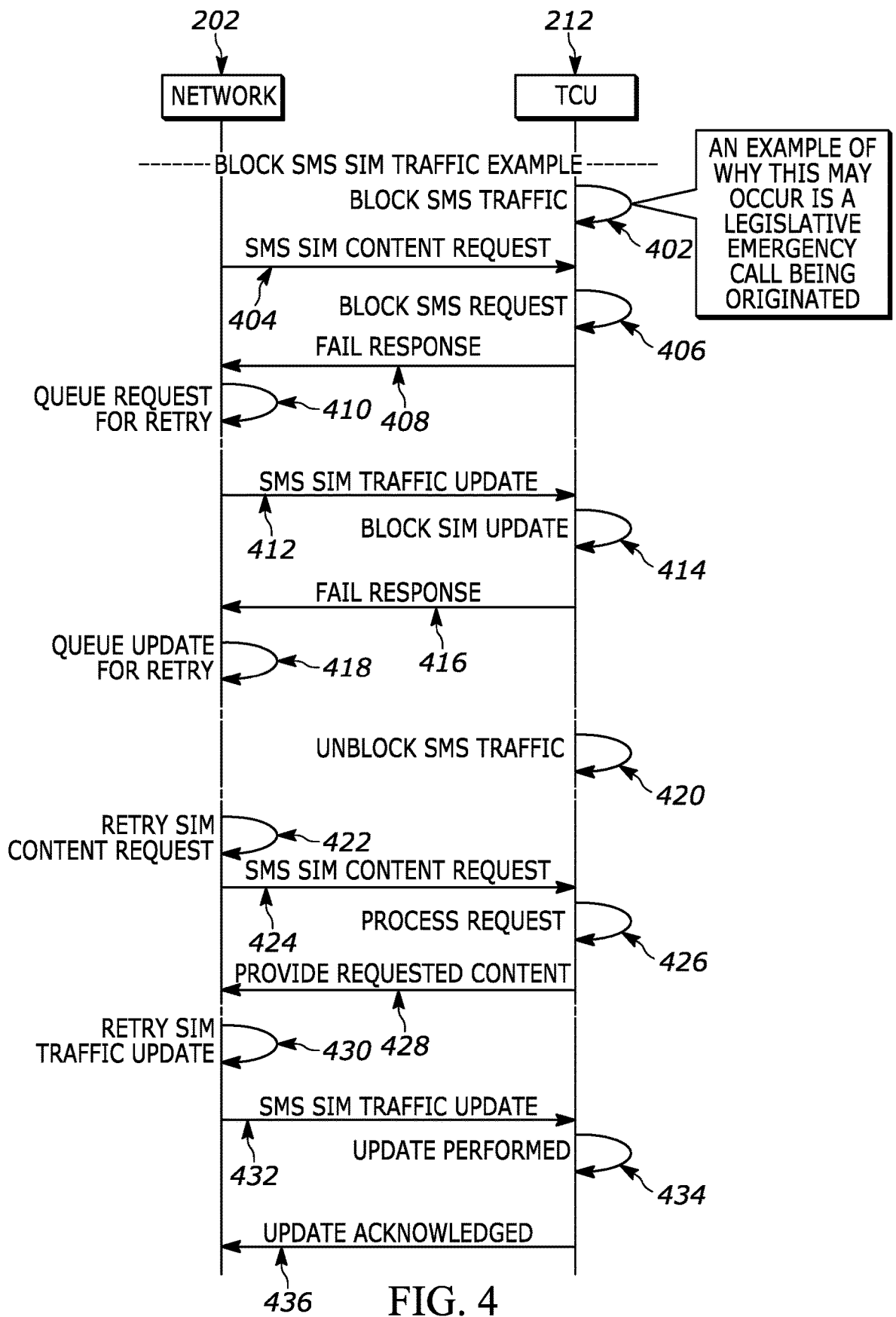
FIG. 4 depicts steps for blocking SMS traffic to and from a SIM card in accordance with embodiments of the invention.

FIG. 4 depicts steps for blocking SMS traffic to and from a SIM card in accordance with embodiments of the invention. Blocking SMS traffic to and from the SIM card prevents SIM-card updates as intended. But it also blocks requests that are not SIM-card updates (e.g. SIM-card content requests).

Upon determining that SIM-card updates should be blocked, the TCU blocks SMS traffic to and from the SIM card, as depicted at 402. The TCU may determine that SIM-card updates should be blocked, for example, during an automotive-telematics-emergency call and while in automotive-telematics-emergency-call-callback mode.

The TCU may block SMS traffic to and from the SIM card in various ways, including, but not limited to, examining the content of SMS messages received from the network to determine whether the messages contain content directed to the SIM card (e.g., a SIM-card update, a SIM-card request, and the like). Upon determining that an SMS message contains content directed to the SIM card, the TCU may block the message by effectively "ignoring" the message. For example, in response to SMS-SIM-content-request message 404, the TCU effectively blocks the request by not providing the requested SIM content. Instead, the TCU sends a fail-response message 408 to the network. The Network then queues the SMS-SIM-content request for a retry, as depicted at 410.

In response to receiving an SMS-SIM-traffic-update message, as depicted at 412, the TCU effectively blocks the SMS-SIM-traffic update, as depicted at 414, by not updating the SIM card, as requested via the SMS-SIM-traffic-update message. Instead, the TCU sends a fail-response message, as depicted at 416, to the network, and the network queues the SMS-SIM-traffic update for a retry, as depicted at 418.

Once the TCU determines that SIM card updates should no longer be blocked (because, for example, an automotive-telematics-emergency call and an automotive-telematics-emergency-call-callback mode have finished), the TCU unblocks SMS traffic, as depicted at 420.

The network 202 subsequently determines that it should retry sending the SIM content request, as depicted at 422, and sends an SMS-SIM-content-request message to the TCU 212, as depicted at 424. The TCU processes the request message, as depicted at 426, and provides the requested content to the network, as depicted at 428. Subsequently, as depicted by the dashed vertical lines below 428, the network sends an SMS-SIM-traffic-update message to the TCU, as depicted at 432. The TCU then updates the SIM card in accordance with the content of the SMS-SIM-traffic-up date message, as depicted at 434. The TCU then sends an up date-acknowledgement message to the network, as depicted at 436.

Figure 5:
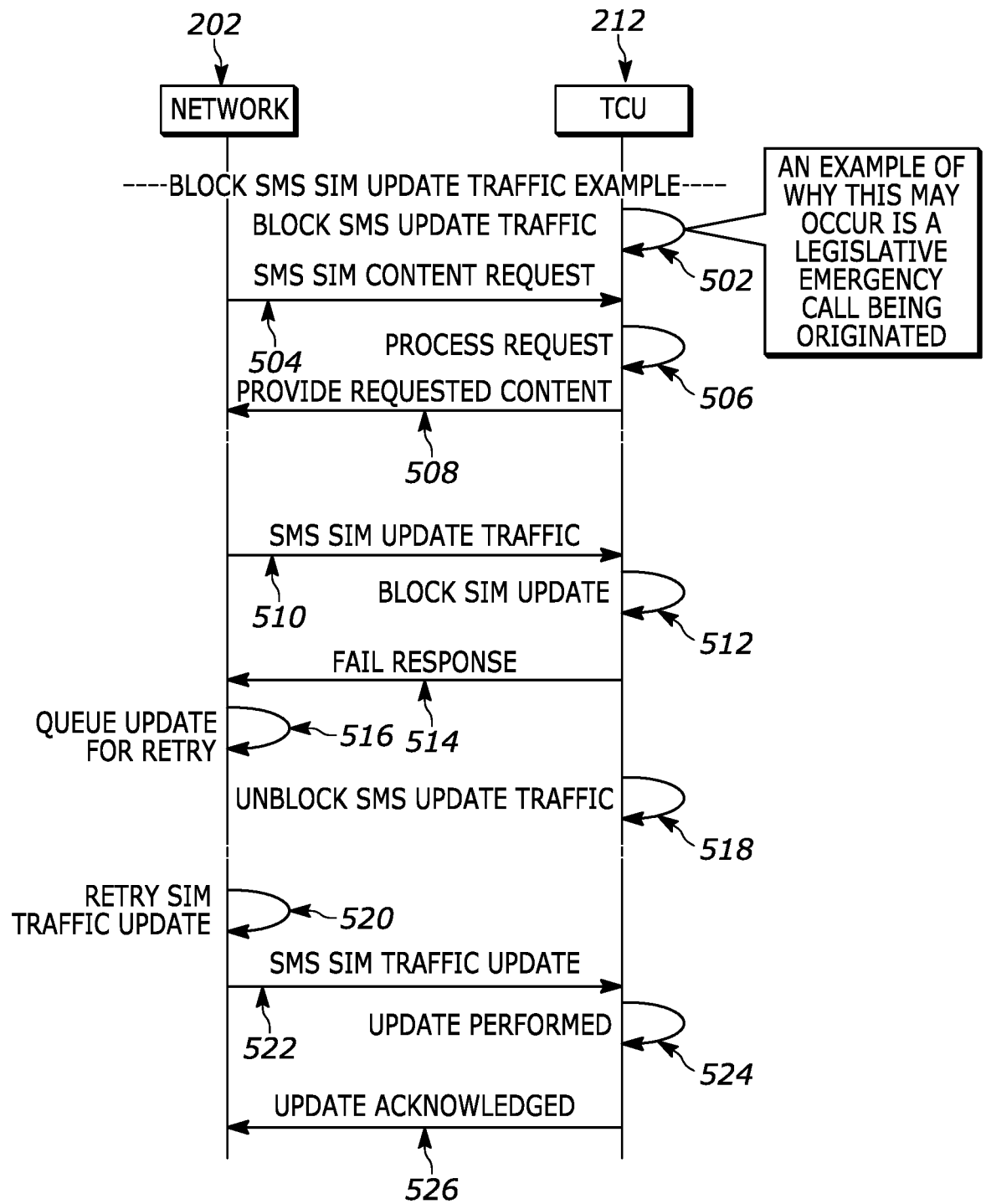
FIG. 5 depicts steps for blocking SMS traffic, which contains a SIM-card OTA updates, sent to the TCU, in accordance with embodiments of the invention.

FIG. 5 depicts steps for blocking SMS traffic (i.e., one or more SMS messages), which contains a SIM-card OTA updates, sent to the TCU, in accordance with embodiments of the invention. This accomplishes the objective of blocking SIM-card updates without blocking other types of SIM requests. In this way, other Bearer Independent Protocol (BIP) requests and other data on the shared Access Point Name (APN) are, advantageously, not blocked.

Upon determining that SIM-card updates should be blocked, the TCU may block SMS-up date traffic to the SIM card, as depicted at 502. The TCU may determine that SIM-card updates should be blocked, for example, during an automotive-telematics-emergency call and while in automotive-telematics-emergency-call-callback mode.

The TCU may block SMS-up date traffic to the SIM card in various ways, including, but not limited to, examining the content of SMS messages received from the network and/or the SIM OTA server to determine whether the SMS messages contain content directed to updating the SIM card (e.g., a SIM-card update and the like). Upon determining that an SMS message contains content directed to updating the SIM card, the TCU may effectively block the message by essentially "ignoring" the SMS message in the sense that the TCU does not proceed with providing the requested SIM-card data.

In response to SMS-SIM-content-request message 504, the TCU does not block the request, and instead processes the request, as depicted at 506, and provides the requested SIM content, as depicted at 508.

In response to receiving an SMS-SIM-update message the TCU effectively blocks the corresponding SIM-card update, as depicted at 512, by not updating the SIM card. Instead, the TCU sends a fail-response message, as depicted at 514, to the network, and the network queues the SMS-SIM-update for a retry, as depicted at 516.

Once the TCU determines that SIM card updates should no longer be blocked (because, for example, an automotive-telematics-emergency call and an automotive-telematics-emergency-call-callback mode have finished), the TCU unblocks SMS-update traffic, as depicted at 518.

The network 202 subsequently determines that it should re-send the SMS-SIM-update traffic, as depicted at 520, and re-sends the SMS-SIM-update traffic to the TCU 212, as depicted at 522. The TCU then updates the SIM card in accordance with the content of the SMS-SIM-update traffic, as depicted at 524. The TCU then sends an update-acknowledgement message to the network, as depicted at 526.

Figure 6:
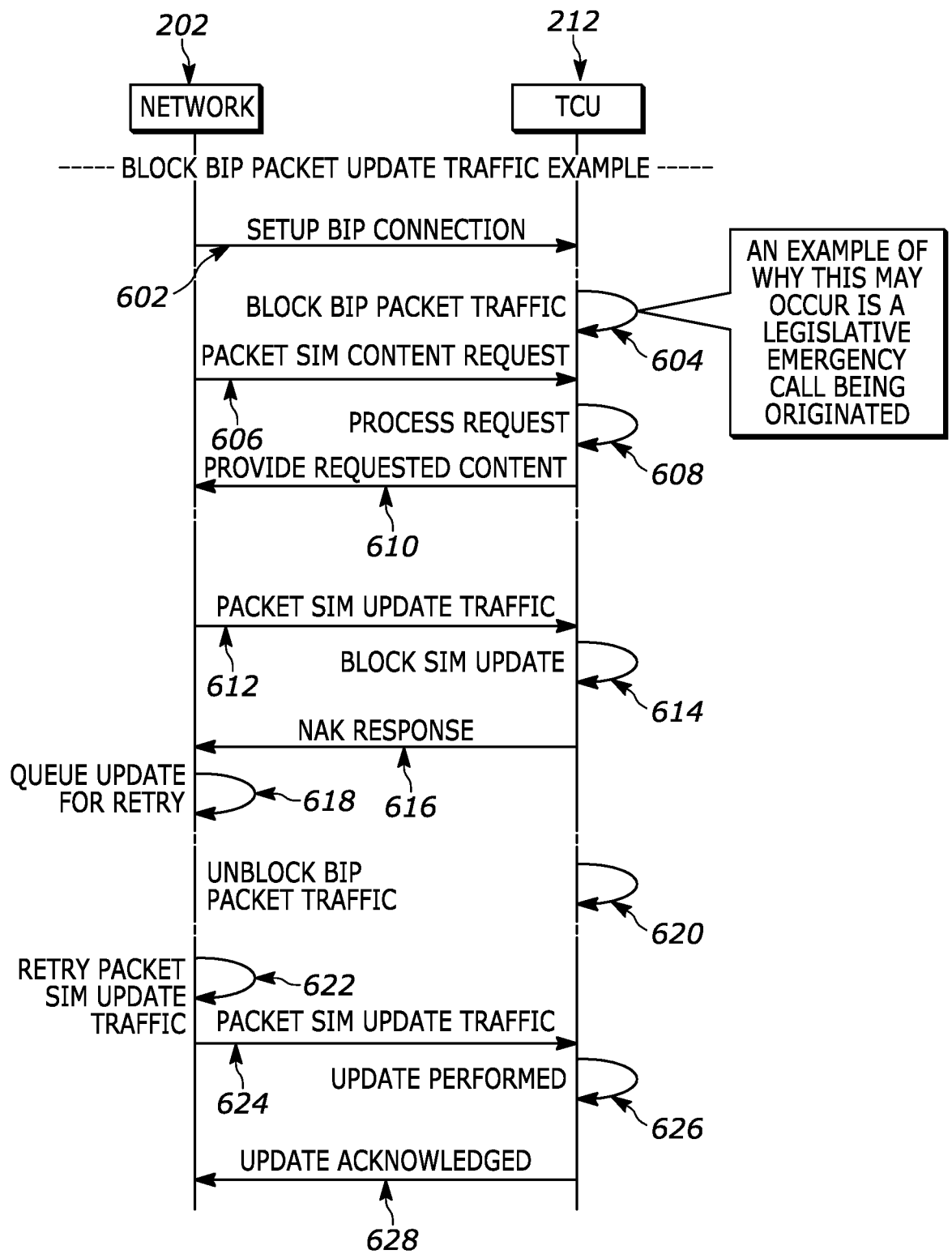
FIG. 6 depicts steps for blocking Bearer Independent Protocol (BIP)-packet-up date traffic in accordance with embodiments of the invention.

FIG. 6 depicts steps for blocking Bearer Independent Protocol (BIP)-packet-up date traffic in accordance with embodiments of the invention. The network sets up a BIP connection with the TCU, as depicted at 602.

Upon determining that SIM-card updates should be blocked, the TCU blocks BIP-up date traffic to the SIM card, as depicted at 604. The TCU determines that SIM-card updates should be blocked during, for example, an automotive-telematics-emergency call and while in automotive-telematics-emergency-call-callback mode.

The TCU may block BIP-up date traffic to the SIM card in various ways, including, but not limited to, examining the content of BIP messages received from the network to determine whether they contain content directed to updating the SIM card (e.g., a SIM-card update and the like). Upon determining that a BIP message contains content directed to updating the SIM card, the TCU may effectively block the BIP message by essentially ignoring the BIP message to the extent that the TCU does not proceed with updating the SIM card.

In response to receiving a packet-SIM-content request, as depicted at 606, the TCU does not block the request, and instead processes the request, as depicted at 608, and provides the requested SIM content, as depicted at 610.

In response to receiving packet-SIM-update traffic, as depicted at 612, the TCU effectively blocks the packet-SIM-update traffic, as depicted at 614, by not updating the SIM card, in the manner requested by the network via the packet-SIM-update traffic. Instead, the TCU sends a negative acknowledgement (NAK) response, as depicted at 616, to the network, and the network queues the packet-SIM-update traffic for a retry, as depicted at 618.

Once the TCU determines that SIM card updates should no longer be blocked (because, for example, an automotive-telematics-emergency call and an automotive-telematics-emergency-call-callback mode have finished), the TCU unblocks BIP-SIM-update traffic, as depicted at 620.

The network 202 subsequently retries sending the packet-SIM-update traffic to the TCU 212, as depicted at 622 and 624. The TCU then updates the SIM card in accordance with the content of the resent packet-SIM-update traffic, as depicted at 626. The TCU then notifies the network that the SIM card has been updated, as depicted at 628.

Figure 7:
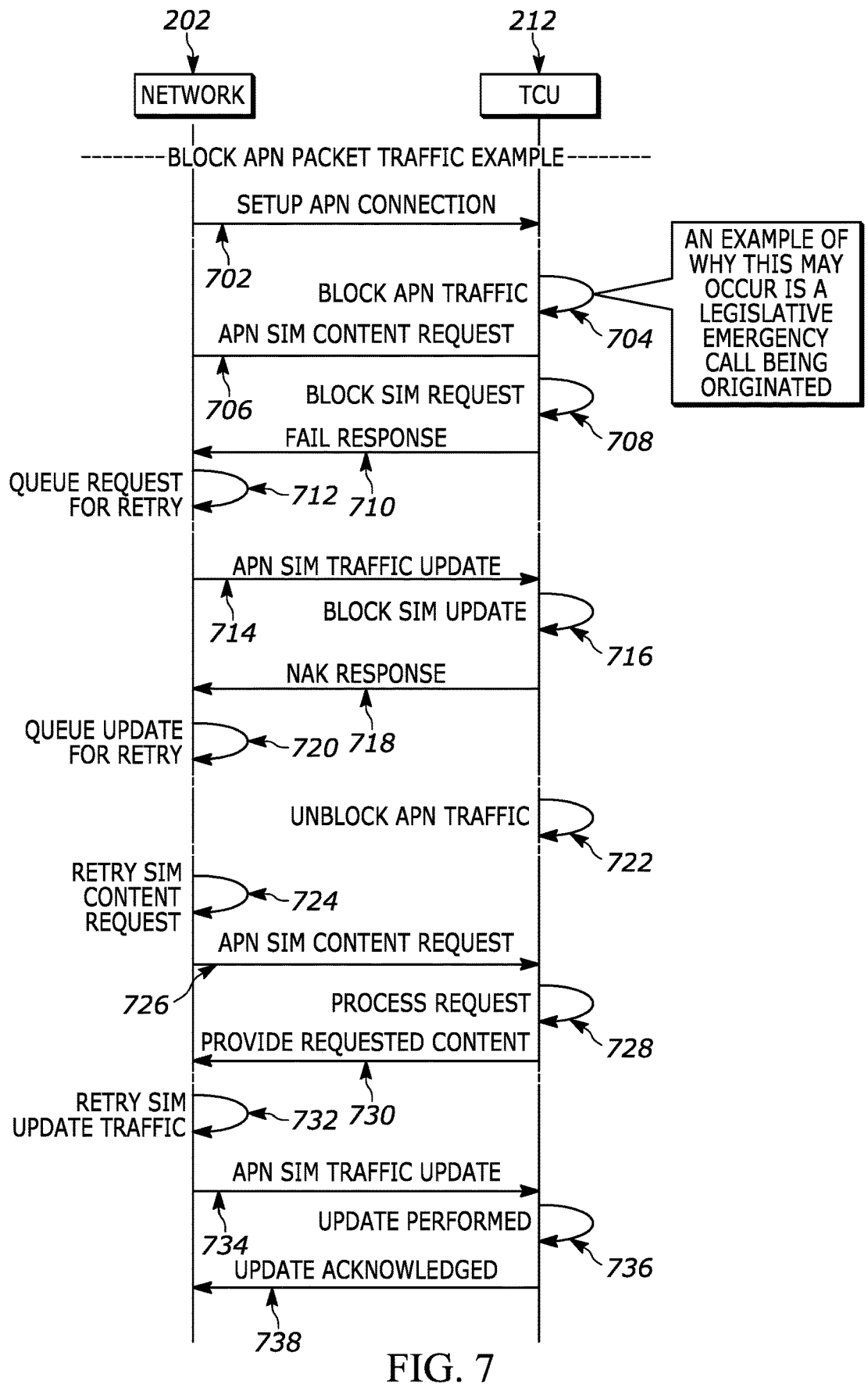
FIG. 7 depicts steps for blocking APN traffic to and from a SIM card in accordance with embodiments of the invention.

FIG. 7 depicts steps for blocking APN traffic to and from a SIM card in accordance with embodiments of the invention. Assuming SIM updates are via BIP, then blocking APN traffic, which blocks BIP traffic, prevents SIM-card updates as intended. APN traffic blocking may be enabled at times when SIM changes are not desired, such as during a Telematics emergency call and while in automotive-telematics-emergency-call-callback mode.

The Network sets up an APN connection with the TCU, as depicted at 702. Upon determining that SIM-card updates should be blocked, the TCU enables blocking of APN traffic to the SIM card, as depicted at 704. The TCU may determine that SIM-card updates should be blocked, for example, during an automotive-telematics-emergency call and while in automotive-telematics-emergency-call-callback mode.

The TCU may block APN traffic to the SIM card in various ways, including, but not limited to, examining the content of APN messages received from the network to determine whether they contain content directed to the SIM card (e.g., a SIM-card update, a SIM-card request, and the like). Upon determining that an APN message contains content directed to the SIM card, the TCU may "ignore" the APN message. For example, in response to APN-SIM-content request 706, the TCU effectively blocks the request, as depicted at 708, by not providing the requested SIM content. Instead, the TCU sends a fail-response message to the network, as depicted at 710. The Network then queues the SMS-SIM-content request for a retry, as depicted at 712.

In response to receiving an APN-SIM-update traffic, as depicted at 714, the TCU effectively blocks the SIM update, as depicted at 716, by not updating the SIM card in the manner requested via the one or more APN-SIM-update messages. Instead, the TCU sends a fail-response message, as depicted at 718, to the network, and the network queues the APN-SIM update for a retry, as depicted at 720.

Once the TCU determines that SIM-card updates should no longer be blocked (because, for example, an automotive-telematics-emergency call and an automotive-telematics-emergency-call-callback mode have finished), the TCU unblocks APN traffic, as depicted at 722.

The network 202 subsequently determines that it should retry the APN content request, as depicted at 724, and re-sends the APN-SIM-content-request traffic to the TCU 212, as depicted at 726. The TCU processes the request traffic, as depicted at 728, and provides the requested content to the network, as depicted at 730. Subsequently, the network sends an APN-SIM-update message to the TCU, as depicted at 734. The TCU then updates the SIM card in accordance with the content of the APN-SIM-update message, as depicted at 736. The TCU then sends an update-acknowledgement message to the network, as depicted at 738.

The various techniques for temporarily preventing SIM updates during certain events, in accordance with embodiments of the invention, are advantageously backward compatible with SIM cards that do not provide a way to disable SIM-card updates.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

The invention claimed is:

1. A method comprising:
   determining whether a SIM-enabled cellular device, which is an automotive Telematics Control Unit (TCU), is in a disable-SIM-card-updates mode of operation, during which SIM-card updates should be disabled in order to not interrupt an automotive telematics emergency call;
   upon determining that the SIM-enabled cellular device is in the disable-SIM-card-updates mode:
      using the SIM-enabled cellular device to block one or more updates of a cellular Subscriber Identity Module (SIM) card of the SIM-enabled cellular device;
      determining whether the SIM-enabled cellular device is no longer in the disable-SIM-card-updates mode; and
      upon determining that the SIM-enabled cellular device is no longer in the disable-SIM-card-updates mode, no longer blocking the one or more updates of the cellular SIM card.

2. The method of claim 1, wherein using the SIM-enabled cellular device to block the one or more updates of the cellular SIM card further comprises blocking Short Message Service (SMS) SIM traffic received by the SIM-enabled cellular device from a cellular network.

3. The method of claim 1, wherein using the SIM-enabled cellular device to block the one or more updates of the cellular SIM card further comprises blocking Short Message Service (SMS) SIM update traffic received by the SIM-enabled cellular device from a cellular network.

4. The method of claim 1, wherein using the SIM-enabled cellular device to block the one or more updates of the cellular SIM card further comprises blocking Bearer Independent Protocol (BIP) packet update traffic received by the SIM-enabled cellular device from a cellular network.

5. The method of claim 1, wherein using the SIM-enabled cellular device to block the one or more updates of the cellular SIM card further comprises blocking Access Point Name (APN) packet update traffic received by the SIM-enabled cellular device from a cellular network.

6. The method of claim 1, wherein the automotive-telematic-emergency call includes a call-back period during which the TCU remains available to receive an emergency call back from a telematics service center.

7. An apparatus comprising:
   a SIM-enabled cellular device having an associated cellular Subscriber Identity Module (SIM) card, wherein the SIM-enabled cellular device is configured to:
      determine whether the SIM-enabled cellular device, which is an automotive Telematics Control Unit (TCU), is in a disable-SIM-card-updates mode of operation, during which SIM-card updates should be disabled in order to not interrupt an automotive telematics emergency call;
      upon determining that the SIM-enabled cellular device is in the disable-SIM-card-updates mode:
         block one or more updates of the cellular SIM card;
         determine whether the SIM-enabled cellular device is no longer in the disable-SIM-card-updates mode;
         upon determining that the SIM-enabled cellular device is no longer in the disable-SIM-card-updates mode, no longer block the one or more updates of the cellular SIM card.

8. The apparatus of claim 7, wherein blocking the one or more updates of the cellular SIM card further comprises blocking Short Message Service (SMS) SIM traffic received by the SIM-enabled cellular device from a cellular network.

9. The apparatus of claim 7, wherein blocking the one or more updates of the cellular SIM card further comprises blocking Short Message Service (SMS) SIM update traffic received by the SIM-enabled cellular device from a cellular network.

10. The apparatus of claim 7, wherein blocking the one or more updates of the cellular SIM card further comprises blocking Bearer Independent Protocol (BIP) packet update traffic received by the SIM-enabled cellular device from a cellular network.

11. The apparatus of claim 7, wherein blocking the one or more updates of the cellular SIM card further comprises blocking Access Point Name (APN) packet update traffic received by the SIM-enabled cellular device from a cellular network.

12. The apparatus of claim 7, wherein the automotive-telematic-emergency call includes a callback period during which the automotive TCU remains available to receive an emergency call back from a telematics service center.

* * * * *